(12) United States Patent  
Schulte

(10) Patent No.: US 6,648,086 B1
(45) Date of Patent: Nov. 18, 2003

(54) SYSTEMS AND METHODS FOR PROVIDING POWER IN A HYBRID-ELECTRIC VEHICLE

(75) Inventor: Juergen Schulte, San Diego, CA (US)

(73) Assignee: ISE Research Corporation, San Diego, CA (US)

(*) Notice: Subject to any disclaimer, the term of this patent is extended or adjusted under 35 U.S.C. 154(b) by 0 days.

(21) Appl. No.: 10/236,206

(22) Filed: Sep. 5, 2002

Related U.S. Application Data

(63) Continuation-in-part of application No. 09/827,972, filed on Apr. 6, 2001.

(51) Int. Cl.[7] .................... B60K 1/00; B60K 41/02; F16H 3/72
(52) U.S. Cl. ................ 180/65.2; 180/65.6; 475/5; 477/5
(58) Field of Search ................ 180/65.1, 65.2, 180/65.3, 65.4, 65.5, 65.6, 65.7, 65.8; 29/401.1, 402.01, 469; 475/5; 74/335; 192/84.6, 94, 111 A; 310/268, 156.32, 156.33, 156.34, 156.35, 156.36, 156.37, 154.05, 154.06

(56) References Cited

U.S. PATENT DOCUMENTS

| | | | | |
|---|---|---|---|---|
| 1,410,276 A | * | 3/1922 | Stephenson | 290/16 |
| 2,571,284 A | * | 10/1951 | Nims | 290/17 |
| 3,994,354 A | * | 11/1976 | Haumaier | 180/65.2 |
| 4,533,011 A | * | 8/1985 | Heidemeyer et al. | 180/65.2 |
| 5,678,646 A | * | 10/1997 | Fliege | 180/65.1 |
| 5,823,280 A | * | 10/1998 | Lateur | 180/65.2 |
| 5,842,534 A | * | 12/1998 | Frank | 180/65.2 |
| 6,083,138 A | * | 7/2000 | Aoyama et al. | 477/5 |
| 6,360,834 B1 | * | 3/2002 | Gauthier | 180/65.2 |

* cited by examiner

Primary Examiner—Brian L. Johnson
Assistant Examiner—Gerald Klebe
(74) Attorney, Agent, or Firm—Procopio, Cory, Hargreaves & Savitch LLP

(57) ABSTRACT

A system and method for providing parallel power in a hybrid-electric vehicle. The system includes a compact motor coupled to the input shaft of the vehicle's transmission. Advantageously, the compact motor and the engine use the same drivetrain. Both the compact motor and the engine are able to apply power to the portion of the drivetrain from the transmission to the wheels. Since the motor is compact and does not require a separate drivetrain, the parallel power system can be installed in an otherwise conventional vehicle without packaging difficulties.

15 Claims, 3 Drawing Sheets

SYSTEMS AND METHODS FOR PROVIDING POWER IN A HYBRID-ELECTRIC VEHICLE

CROSS-REFERENCE TO RELATED APPLICATIONS

This application is a continuation-in-part application of pending U.S. application Ser. No. 09/827,972, which was filed on Apr. 6 2001.

BACKGROUND OF THE INVENTION

1. Field of the Invention

The field of the invention relates to systems and methods for providing parallel power in a hybrid-electric vehicle.

2. Background

Hybrid electric vehicles (HEVs) combine the internal combustion engine of a conventional vehicle with the battery and electric motor of an electric vehicle, and provide better fuel economy than comparable conventional vehicles. This combination offers the extended range and rapid refueling that consumers expect from a conventional vehicle, with a significant portion of the energy and environmental benefits of an electric vehicle. The practical benefits of HEVs include improved fuel economy and lower emissions compared to conventional vehicles.

A hybrid's efficiency and emissions depend on the particular combination of subsystems, how these subsystems are integrated into a complete system, and the control strategy that integrates the subsystems. Existing HEVs use complex integration systems, which, while efficient, have not yet proven to be economically feasible. The commercial success of HEVs has been hindered by the economics of producing a complex hybrid power system rather than by the inherent capabilities of the technology. Complexity is a major disadvantage of existing HEV configurations, and has inhibited the acceptance of HEVs in the marketplace.

HEV configurations fall into two basic categories: series and parallel. In a series hybrid, the internal-combustion engine drives a generator that charges the batteries, which power an electric motor. Only the electric motor can directly turn the vehicle's wheels to propel the vehicle. In contrast, in a parallel hybrid either the engine or the motor can apply torque to the wheels. Both the parallel and the series hybrid can be operated with propulsion power supplied only by the internal-combustion engine. But in a series hybrid, this power is inefficiently applied through the generator and the electric motor. Parallel HEVs do not require a generator, because the motor generates electricity when driven by the engine. Parallel HEVs are thus less complex than series HEVs. Another advantage of the parallel scheme is that a smaller engine, electric motor, and battery pack can be used, because the engine and the motor work together to drive the vehicle.

Turning to series HEVs, an advantage of series configurations is that the internal-combustion engine can be located anywhere in the vehicle because it does not transmit power mechanically to the wheels. This is advantageous for designing the vehicle because the designer has more freedom of choice in determining where the internal combustion engine should be located. In contrast, parallel configurations must connect both the motor and the engine to the drivetrain. This requires the motor and the engine to be in proximity to each other. Though parallel configurations are generally preferred for their flexible power output, the difficulty of packaging both a conventional engine and a conventional electric motor in a drivetrain has been a major disadvantage of existing parallel HEVs.

Another problem with conventional parallel configurations is that they do not allow easy conversion of conventional vehicles to parallel HEVs. For example, a parallel HEV system is disclosed in U.S. Pat. No. 6,083,138 issued to Aoyama et al. (Aoyama). Because of the nature of the system disclosed in Aoyama, however, complex control systems are required to control a variable torque clutch 3, a Continuously Variable Transmission (CVT), the internal combustion engine, and a plurality of motors, one of which is required to power the CVT's hydraulic pump system. Consequently, a conventional vehicle cannot be easily converted to a parallel HEV using the system disclosed in Aoyama, because the system disclosed in Aoyama is not compatible with a conventional clutch or a conventional transmission. Thus, these components would also need to be replaced. Further, the complex control systems and plurality of motors also need to be installed making conversion of a conventional vehicle using the systems disclosed in Aoyama even more difficult.

SUMMARY OF THE INVENTION

An aspect of the present invention involves a system and method for providing parallel power in a hybrid-electric vehicle. The system includes a compact motor coupled to the input shaft of the vehicle's transmission. Advantageously, the compact motor and the engine use the same drivetrain. Both the compact motor and the engine are able to apply power to the portion of the drivetrain from the transmission to the wheels. Since the motor is compact and does not require a separate drivetrain, the parallel power system can be installed in an otherwise conventional vehicle without packaging difficulties.

Other and further objects, features, aspects, and advantages of the present invention will become better understood with the following detailed description of the accompanying drawings.

BRIEF DESCRIPTION OF DRAWINGS

The following drawings illustrate both the design and utility of preferred embodiments of the invention.

DETAILED DESCRIPTION OF THE PREFERRED EMBODIMENTS

Figure 1:
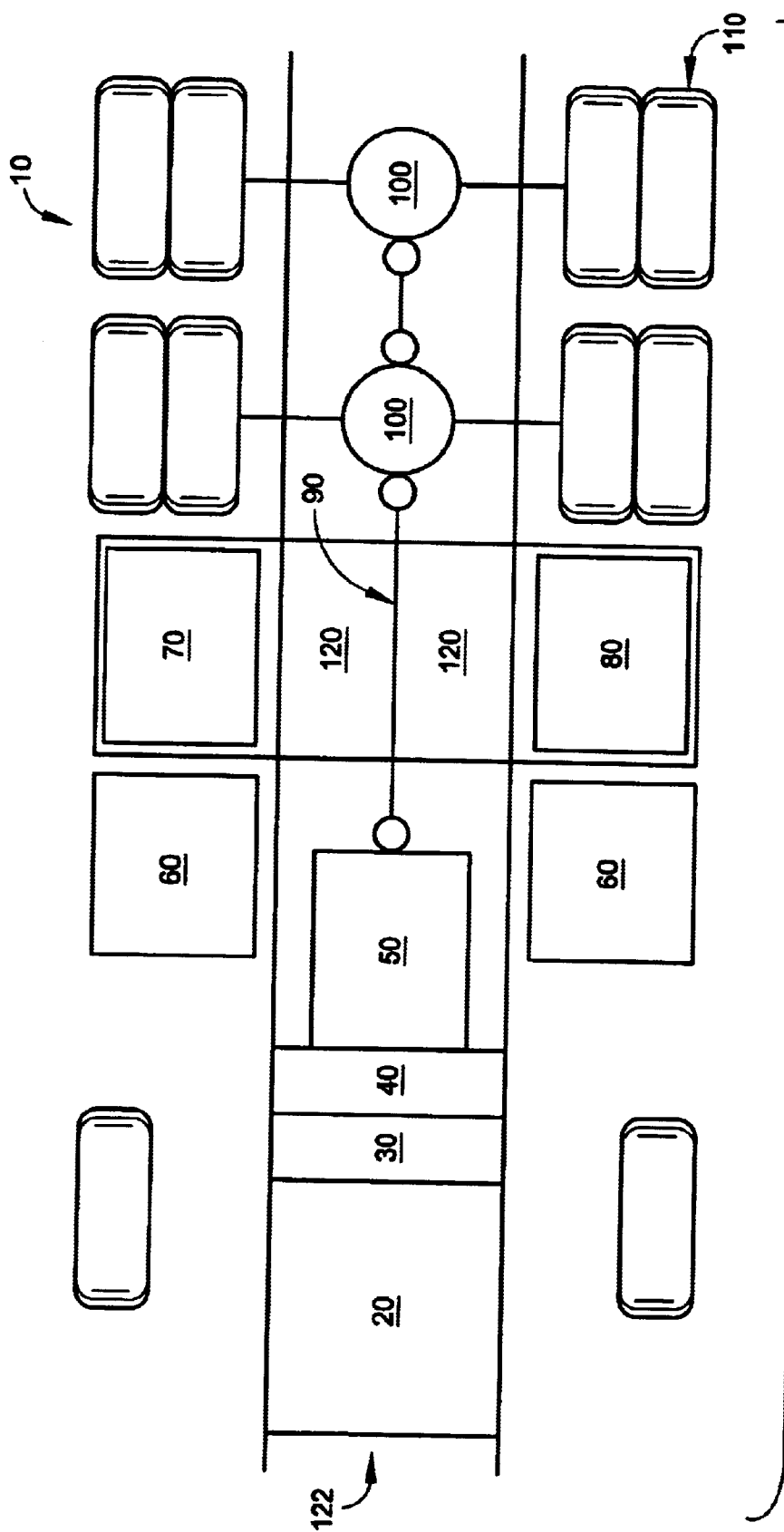
FIG. 1 is a top diagram view of a hybrid electric vehicle constructed in accordance with an embodiment of the present invention.

FIG. 1 shows a diagram of a parallel hybrid electric vehicle (HEV) 10 constructed in accordance with an embodiment of the present invention. The vehicle 10 comprises an engine 20, a coupling 30, a compact motor 40, a transmission 50, fuel tanks 60, auxiliary components 70, an inverter system 80, drive shaft 90, differential 100, wheels 110, and an energy storage pack 120. A parallel hybrid electric drivetrain 122 may include one or more of the engine 20, the coupling 30, the compact motor 40, the transmission 50, the drive shaft 90, and the differential 100.

The vehicle 10 shown in FIG. 1 is a heavy-duty vehicle. A heavy-duty vehicle is preferably a vehicle having a gross vehicle weight (GVW) of at least 10,000 lbs. Examples of heavy-duty vehicles that the parallel hybrid electric drivetrain 122 may be used with include, but not by way of limitation, a tractor, a tow tractor, a tug, a pull tractor, a push-back tractor, a truck (e.g., class 6, class 7, class 8, etc.), a dump truck, a semi truck, a bobtail truck, a school bus, a transit bus, a pick-up truck, a shuttle van, a refuse-collection vehicle, a recycling-collection vehicle, and a tram vehicle. The parallel hybrid electric drivetrain 122 may be used with vehicles other than heavy-duty vehicles, and, thus, is not limited to heavy-duty vehicles.

The engine 20 may comprise a spark ignition engine, compression ignition engine, turbine engine, or any other engine that transmits power through a rotating shaft. The coupling 30 couples the engine 20 to the compact motor 40. The coupling 30 is preferably capable of connecting and disconnecting the engine power from the compact motor 40. The coupling 30 may include, but is not limited to, a clutch, torque converter, or positive mechanical link. In FIG. 1, the coupling 30 is understood to be housed in a bellhousing. The HEV system is a parallel system, meaning that the engine 20 and compact motor 40 can simultaneously provide power to the drivetrain, and thus to the wheels 110.

Figure 2:
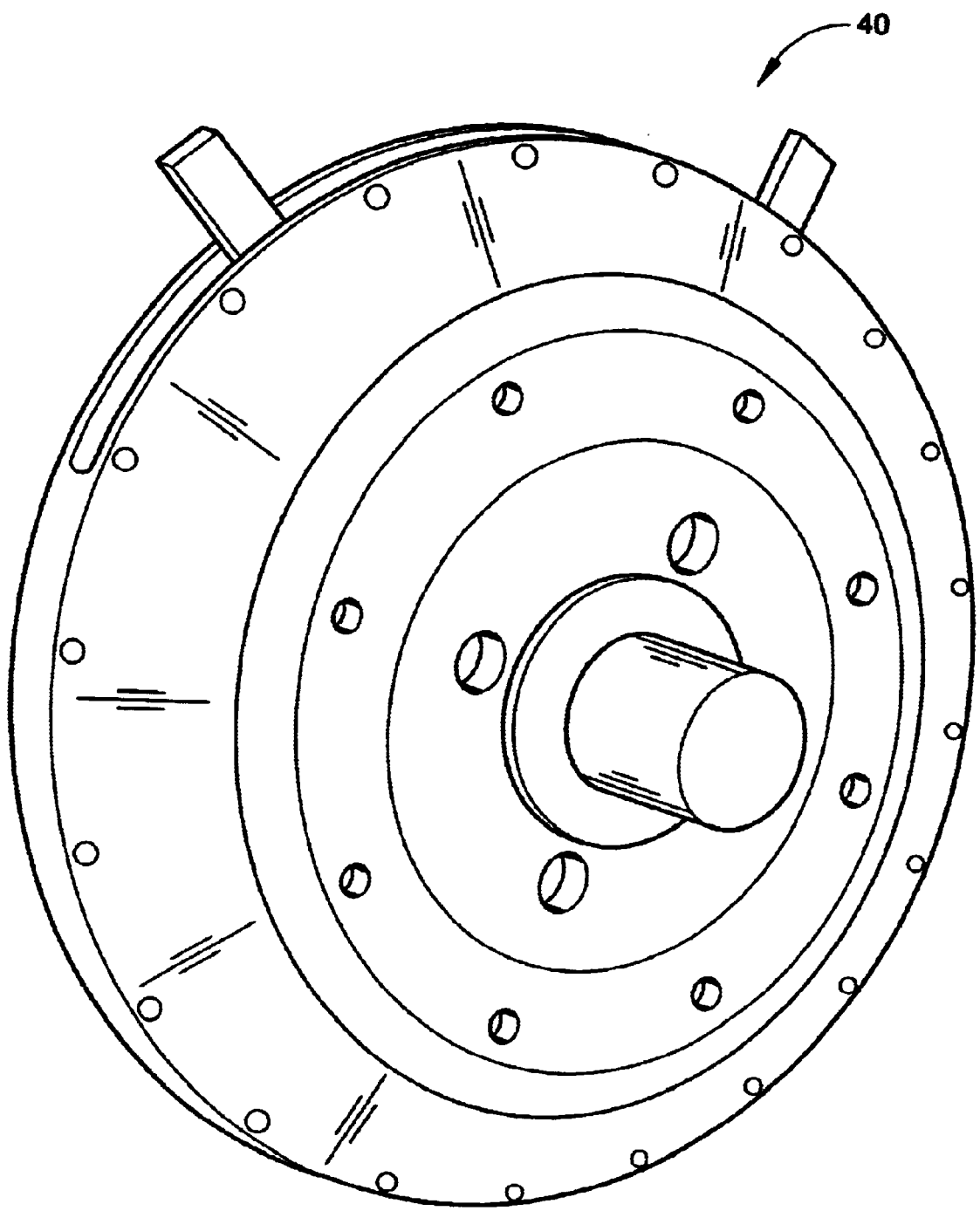
FIG. 2 is a front perspective view of a compact electric motor constructed in accordance with an embodiment of the present invention.

FIG. 2 shows an embodiment of a compact motor 40 constructed in accordance with the present invention. The compact motor 40 is preferably a pan-type motor to minimize axial length. It is to be understood that motor specifications will vary with vehicle requirements, with smaller vehicles typically requiring smaller motors and larger vehicles normally requiring larger motors. The compact motor 40 shown in FIG. 2 is illustrative of compact motors adapted for use in heavy duty HEVs. The compact motor 40 is eighteen inches in diameter, four inches long, and meets the following specifications:

Motor Type: PM Brushless DC
Maximum Torque: 1000 Nm@250 Arms/ph for 2 min.
Maximum speed: 2500 rpm
Peak efficiency: 92%
Coolant: Weg 50
Coolant flow rate: 5 gpm
Pressure drop: 5 psi
Max. Inlet temperature: 75 C.
Max. Ambient temperature: 65 C,
Weight: 95 lb A suitable liquid cooled traction motor is available from Precision Magnetic Bearing Systems, Inc. of Cohoes, N.Y. Such pan-type motors use powerful permanent magnets to reduce size, and employ thin-stator designs to allow the motors to be compact.

In heavy-duty embodiments comprising digital controller area networks (CANs), the compact motor 40 is preferably driven by a 250 kW CANverter inverter 80. When used with the compact motor 40 specified above, the inverter 80 preferably meets the following specifications:

Motor Options: PM Brushless or AC
Continuous Power: 250 kW
Input Voltage: 600 Vdc
Output Current (Apk/ph.): 600A@25 C.; 420A@70 C
Peak Efficiency: 97.50%
Coolant: Ethylene/Glycol 50—50
Coolant Flow: 5 gpm
Pressure Drop: 5 psi
Inlet Temperature: 167° F. (75° C.)
Size: 14.4×8.7×4.2 in
Weight: 27 lbs (12 kg)

A suitable CANverter inverter 80 is available from Precision Magnetic Bearing Systems, Inc. of Cohoes, N.Y. It is to be understood that inverter specifications will vary with motor requirements.

Since the compact motor 40 can provide power to the drivetrain, the engine 20 can be reduced in size proportionally to the output of the motor 40. For instance, given the specifications above, the heavy-duty HEV would have approximately two-hundred additional horsepower when the compact motor 40 was providing full assist. If the engine in a comparable conventional vehicle produced, for instance, four-hundred horsepower, the engine 20 in the embodiment described above need only produce half as much power. Lower power requirements permit the use of smaller, less polluting, more efficient engines.

The transmission 50 is preferably an automated manual shift transmission (shift by wire). Also, in this embodiment, the coupling 30 can be a conventional clutch mechanism (including flywheel), or it can be a positive mechanical link. The clutch may be optional during use because at low speeds, the engine is preferably off, and the motor is driving the vehicle. Therefore, engine stalling is not an issue. Though disengaging a clutch during motor-only operation would advantageously prevent the motor from spinning the engine, re-engaging the clutch while moving would likely jerk the vehicle, similar to a push start. Nevertheless, a clutch would be advantageous in applications where the vehicle operates at very low, motor-only speeds for extended lengths of time (so the motor would not have to expend energy spinning the engine).

The ability to use a conventional clutch is advantageous because it allows for easy conversion of a conventional vehicle to a parallel HEV using the systems and methods described herein. A method of converting a conventional vehicle to a parallel HEV using the systems and methods are described herein in more detail below, but it should be pointed out that the ability to implement a parallel HEV system using a conventional clutch and a conventional transmission means that these components do not need to be replaced when converting a conventional vehicle. Further, complex control systems and additional motors can also be avoided, thus making the conversion of an existing vehicle to a parallel HEV easier and less costly.

In applications where no clutch is used, the motor 40 turns the engine 20 without injecting fuel until the engine speed reaches approximately 1000 RPM. The engine 20 starts immediately when fuel is introduced into the engine 20 when it is spinning at 1000 RPM. By not running the engine 20 at low speeds or at idle, noise and pollution is abated, and clutch wear is prevented. This embodiment requires electrically driven accessories so that accessories can operate with the engine off.

By placing the coupling 30 between the engine 20 and the compact motor 40, the motor is capable of operating independently of the engine, for instance when the coupling 30 comprises a disengaged clutch. It is also advantageous to place the coupling 30 between the engine 20 and the motor 40 to move the motor 40 away from the heat and vibration of the engine 20.

In various embodiments, the energy storage pack 120 may include, but is not limited to, ultracapacitors, high power prismatic NIMH batteries, or lead-acid batteries. The compact motor 40 preferably also acts as a generator to charge the energy storage pack 120. The compact motor 40 generates electricity during regenerative braking, and as needed by spinning the motor with energy from the engine. Regenerative braking also reduces wear on brake components.

Though it is desirable to convert vehicles to parallel HEVs, converting a conventional vehicle to a parallel HEV has, until now, proven to be expensive and time consuming. For instance, the parallel drive systems produced by Allison Transmission and Enova require many new components and significant changes to the drivetrain. Similarly, the parallel drive systems employed in the Toyota Prius and Honda insight are vehicle specific; entirely new vehicles were built around the HEV components.

In contrast to the existing expensive and time consuming systems and methods for converting vehicles to parallel HEVs, the systems and methods described herein allow a conventional vehicle to be easily converted into parallel HEV by installing a compact motor 40 between the coupling 30 and the transmission 50 in the conventional vehicle.

The process of converting a conventional vehicle to a parallel HEV according to an embodiment of the present invention comprises the following steps: removing the transmission 50 and driveshaft 90; replacing the transmission input shaft with one that is long enough to accommodate the additional axial length of the compact motor 40; providing a compact motor 40 that is machined on one side to mount to the transmission, and is machined on the other side to mount to the bellhousing; assembling the compact motor 40 to either the transmission 50 or the bellhousing; reinstalling the transmission in the vehicle; and replacing the driveshaft 90 with one that is shortened appropriately to compensate for the offset of the transmission 50. Once the compact motor 40 is installed, a conventional HEV control system, energy storage system, and inverter are utilized to complete the conversion.

Though a retrofit application is discussed above, it is clear that the design principles of the present invention could easily be applied to original equipment manufacturing (OEM) applications. For instance, original equipment manufacturers are motivated to continue using existing parts when possible; redesign and retooling are expensive. The present invention is advantageous in both aftermarket and OEM contexts because it provides a system for converting current production drivetrains to parallel HEV drivetrains with a minimal number of new parts or design changes.

Figure 3:
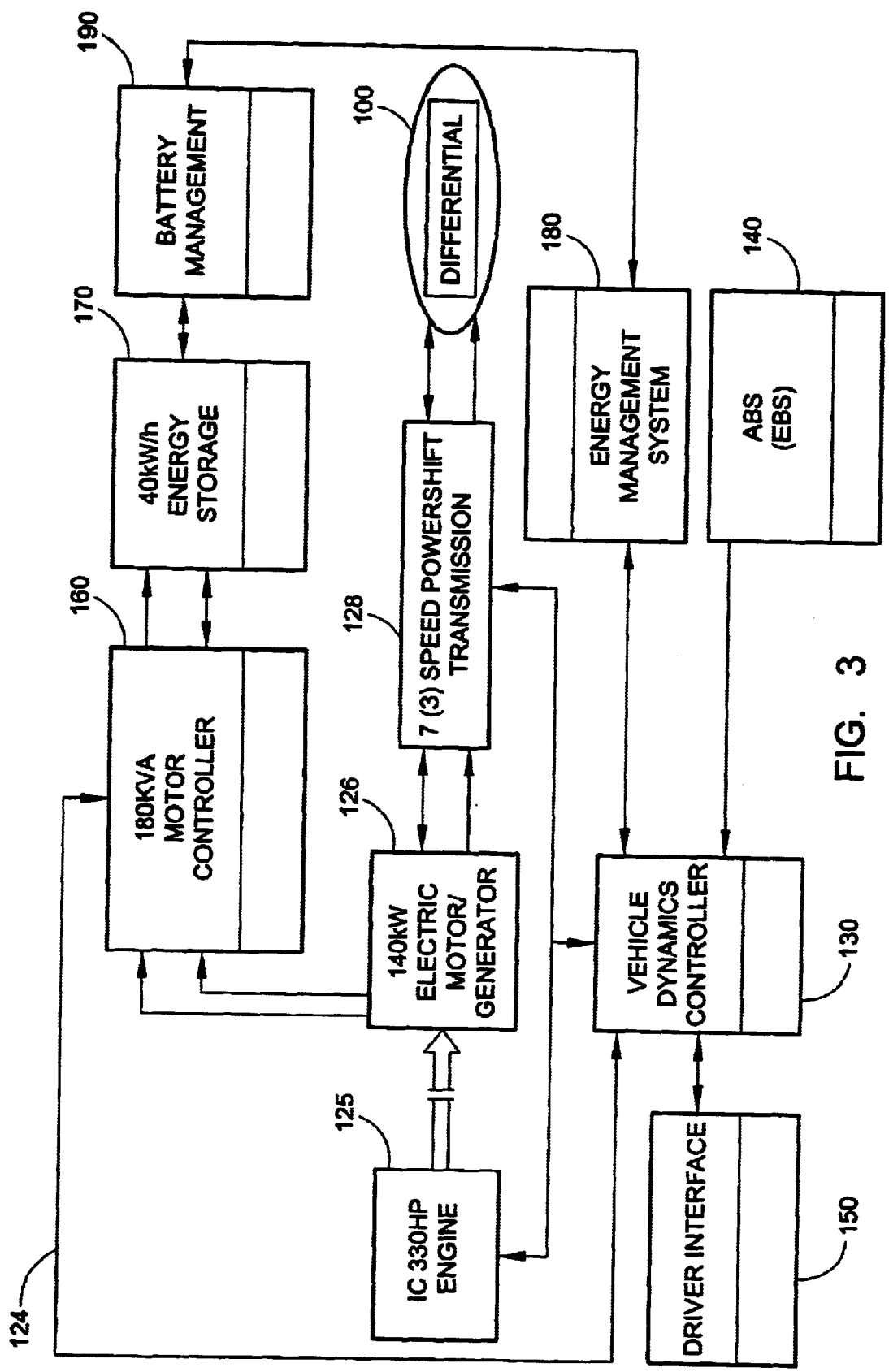
FIG. 3 is a schematical view of a system constructed in accordance with an embodiment of the present invention for providing parallel power in a hybrid-electric vehicle.

With reference to FIG. 3, an embodiment of a parallel hybrid electric drivetrain and control system 124 will now be described. In this embodiment, a 330 horsepower internal combustion engine 125 is connected in parallel with a compact 140 Kw electric motor/generator 126, which is mounted on one side to a seven-speed powershift transmission 128. A vehicle dynamics controller 130 receives inputs from vehicle systems 140 such as anti-lock breaking system (ABS) and speed sensors, and from driver interface 150, which may include acceleration/braking, driver controls, and driver information. Based on those inputs, the vehicle dynamics controller 130 controls power distribution between the engine 125 and the motor 126, and may provide input to the transmission 128.

The vehicle dynamics controller 130 does not communicate directly with the motor 126, but instead communicates with a motor controller 160, in this case a 180 kVA motor controller 160. Also in communication with the motor controller 160 is the energy storage system 170, which is managed by an energy management system 180. The energy storage system 170 in this embodiment comprises between 28 and 50 twelve volt batteries each rated at 80–90 amp-hours, for approximately 40 kW/h of energy storage. Since batteries are used, a battery management system 190 equalizes and maintains the batteries. The energy management system 180 monitors the amount of power or energy available in the energy storage system 170, and provides this information to the vehicle dynamics controller 130. In vehicles utilizing SAE CAN J1939 networks, the vehicle dynamics controller 130 can be connected to the network, completing the system.

Although the present invention has been described above in the context of certain preferred embodiments, it is to be understood that various modifications may be made to those embodiments, and various equivalents may be substituted, without departing from the spirit or scope of the invention.

What is claimed is:

1. A converted, heavy duty parallel hybrid-electric vehicle system of a converted, heavy duty parallel hybrid-electric vehicle having a GVW of at least 10,000 lbs., comprising:
    a modified transmission including a modified input shaft;
    an internal combustion engine coupled with the modified transmission, the internal combustion engine configured to drive the modified transmission;
    a compact, pan-type electric motor having a relatively short axial length, the Compact, pan-type electric motor coupled with the modified transmission and located between the internal combustion engine and the modified transmission, the compact, pan-type electric motor configured to drive the modified transmission;
    a coupling configured to couple the internal combustion engine with the modified transmission, the coupling configured to either fully engage or fully disengage the internal combustion engine with the modified transmission,
    wherein the modified input shaft includes an increased length to accommodate the axial length of the compact, pan-type electric motor.

2. The system of claim 1, wherein the electric motor is located between the coupling and the transmission.

3. The system of claim 1, wherein the coupling is conventional clutch found in a conventional vehicle.

4. The system of claim 1, wherein the transmission is conventional transmission found in a conventional vehicle.

5. The system of claim 1, wherein the electric motor is configured to drive the transmission at low vehicle speeds.

6. The system of claim 1, farther comprising:
    an energy storage system configured to store energy;
    the electric motor coupled with the energy storage system, the electric motor configured to drive the transmission using energy stored in the energy storage system and to act as a generator to charge the energy storage system when required.

7. The system of claim 6, wherein the internal combustion engine is further configured to spin the electric motor when required so that the electric motor can generate electricity to charge the energy storage system.

8. The system of claim 7, wherein the electric motor is further configured to generate electricity to charge the energy storage system during regenerative braking.

9. The system of claim 8, further comprising a motor controller configured to control the operation of the electric motor, wherein the electric motor is coupled with the energy storage system through the motor controller.

10. The system of claim 9, further comprising:
    an energy management system coupled with the energy storage system, the energy storage system configured to monitor the energy available in the energy storage system; and a vehicle dynamics controller coupled with the energy management system, the motor controller, and the internal combustion engine, the vehicle dynamics controller configured to receive an indication of the amount of energy available in the energy storage system from the energy management system and to control power distribution between the electric motor and the internal combustion engine based on the received indication.

11. The system of claim 10, further comprising a plurality of vehicle systems coupled with the vehicle dynamics controller, the vehicle dynamics controller further configured to receive inputs from the plurality of vehicle systems and to control power distribution between the electric motor and the internal combustion engine based on the received inputs.

12. A converted, heavy duty parallel hybrid-electric vehicle system of a converted, heavy duty parallel hybrid-electric vehicle having a GVW of at least 10,000 lbs., comprising:

a modified transmission including a modified input shaft;

an internal combustion engine coupled with the modified transmission, the internal combustion engine configured to drive the modified transmission;

a compact, pan-type electric motor having a relatively short axial length, the compact, pan-type electric motor coupled with the modified transmission and located between the internal combustion engine and the modified transmission, the compact, pan-type electric motor configured to drive the modified transmission;

a positive mechanical link configured to couple the internal combustion engine with the modified transmission, wherein the modified input shaft includes an increased length to accommodate the axial length of the compact, pan-type electric motor.

13. The system of claim 12, wherein the electric motor is configured to drive the transmission at low vehicle speeds without injecting fuel into the internal combustion engine.

14. The system of claim 13, wherein fuel is injected into the internal combustion engine once the engine rotational speed reaches 1000 rpm.

15. The system of claim 12, wherein the transmission is a conventional transmission found in a conventional vehicle.

* * * * *